(12) United States Patent
Fujii

(10) Patent No.: US 7,376,720 B2
(45) Date of Patent: May 20, 2008

(54) APPARATUS SETTING UPDATING SYSTEM

(76) Inventor: Tatsuya Fujii, 4-31 Kashiwado-machi, Nishinomiya-shi, Hyogo 662-0097 (JP)

( * ) Notice: Subject to any disclaimer, the term of this patent is extended or adjusted under 35 U.S.C. 154(b) by 882 days.

(21) Appl. No.: 10/472,550

(22) PCT Filed: Mar. 20, 2003

(86) PCT No.: PCT/JP02/02723

§ 371 (c)(1),
(2), (4) Date: Sep. 23, 2003

(87) PCT Pub. No.: WO02/078385

PCT Pub. Date: Oct. 3, 2002

(65) Prior Publication Data

US 2005/0102663 A1    May 12, 2005

(30) Foreign Application Priority Data

Mar. 20, 2003 (JP) .............................. 2001-086441

(51) Int. Cl.
*G06F 15/177* (2006.01)
(52) U.S. Cl. ..................... 709/221; 709/220; 709/222; 717/174; 717/177
(58) Field of Classification Search ................ 709/203, 709/211, 220–223, 226; 717/168–178
See application file for complete search history.

(56) References Cited

U.S. PATENT DOCUMENTS 6,049,671 A * 4/2000 Slivka et al. ............... 717/173
6,230,194 B1 * 5/2001 Frailong et al. ............ 709/220
6,493,871 B1 * 12/2002 McGuire et al. ............ 717/173
2006/0130046 A1 * 6/2006 O'Neill ...................... 717/168

FOREIGN PATENT DOCUMENTS

JP          63-159959          7/1988

(Continued)

OTHER PUBLICATIONS

Notification of Reason(s) for Refusal for the Japanese counterpart appliccation No. 2002-576472 (with English translation) dated Jul. 25, 2006.

(Continued)

*Primary Examiner*—William Vaughn
*Assistant Examiner*—Mohamed Ibrahim
(74) *Attorney, Agent, or Firm*—Cheng Law Group PLLC

(57) ABSTRACT

The present invention relates to a system for updating settings of an apparatus through a network. The system comprise confirmation modification request generating means generating a confirmation modification request, and confirmation modification request transmitting means adding all or a part of the installation data to the confirmation modification request and the apparatus unique data and transmits them. On the other hand, the state of the apparatus is analyzed from the apparatus unique data by apparatus state analyzing means. New installation data generating means generates new installation data consisting of analysis result data corresponding to a confirmation request and modification data corresponding to a modification request. The installation data is updated with the new installation data by installation data updating means, thereby updating the function of the apparatus, operation of the apparatus, setting of the apparatus, state of the apparatus, data version, and the like.

6 Claims, 10 Drawing Sheets

FOREIGN PATENT DOCUMENTS

| | | |
|---|---|---|
| JP | 02-263231 | 10/1990 |
| JP | 08-154279 A1 | 6/1996 |
| JP | 11-041364 | 2/1999 |
| JP | 11-041364 A1 | 2/1999 |
| JP | 2000-163361 | 6/2000 |
| JP | 2001-014151 | 1/2001 |

OTHER PUBLICATIONS

English Translation of International Preliminary Search Report mailed on Dec. 11, 2003.

International Search Report for PCT/JP02/02723 mailed on Jul. 2, 2002.

* cited by examiner

APPARATUS SETTING UPDATING SYSTEM

TECHNICAL FIELD

The present invention relates to a system for updating settings of an apparatus through network. The system updates at least one piece of data chosen out of data on the function of the apparatus, operation of the apparatus, setting of the apparatus, state of the apparatus, and version of each of the data.

BACKGROUND ART

Regarding apparatuses such as cellular phones, personal computers, data terminal equipment, mobile data terminals, office automation equipment, home electric appliances, game machines, it is known that an update of data concerning the function, operation, setting, and state of the apparatus is usually unfeasible. In order to receive various new services offered one after another, there is a need to install software designed for such new services. When reinstalling upgraded software to correct functional defectiveness, under present circumstances, there is no choice but to bring the apparatus to retail stores and ask experts to replace with the upgraded software because apparatuses are integrated at great packing densities.

By the way, the commonly used technology in the data updating system to upgrade software includes push technology and pull technology. With pull technology users access the Internet that is interconnected to computer networks and operate to retrieve information from the WWW (World Wide Web) or the like. On the contrary, push technology does not need operations by the users but allows the client's apparatus to automatically install information distributed by a server.

One of the typical data updating systems using push technology is a distribution system in which a news server on the Internet unilaterally delivers information including various kinds of news to apparatuses. JP 2001-75785A proposes a data updating system, using push technology, which is capable of fairly and surely updating information stored in every terminal to the information of a newest version by simple constitution with HLR (Home Location Register) for registering the position registration information without imposing burdens on users.

On the other hand, typical data updating system using pull technology includes a system for downloading application data such as music data, image data selected by the user to the apparatus; a system for downloading new application function selected by the user to the apparatus; a system for installing a driver with the aim of connecting office automation equipment or the like on a network.

The user usually has to bring his/her apparatus to a retail store to reprogram software in order to receive the frequently offered new services or to improve software.

In reality, however, the user coped with the offer of the new services by a newly developed late-model apparatus rather than by reprogram of software. There is a problem with economical inefficiency because the user needs to buy a new apparatus to receive the new services. There is also another problem of which scrapping still useful apparatus spurs profligate use of the resources.

In addition, the offer of the new services requires the apparatus to have advanced and multiple functions, which leads to a continuous increase in capacity of programs to perform the functions. This makes operations of the apparatus to perform the functions more complicated than ever.

With the increase in capacity of programs, a storage medium of the apparatus becomes larger, which hampers the apparatus from downsizing and lowering price. The complicated operations to perform the functions bring the user poor usability; therefore, the user sometimes may not be able to utilize all functions.

Also the complicated operations cause improper settings that likely cause failures or pseudo-failures. The user needs a support from the apparatus distributor to solve these troubles and cannot use the apparatus for a while, which also impairs the usability.

In order to support the user to operate the apparatus, an instruction manual is supplied with the apparatus to help the user's understanding of the operation method, but the instruction manual increases its descriptions and pages by growing and expanding in functions of the apparatus, thereby being difficult for the user to understand.

The use of push technology makes is possible to automatically update software installed in every apparatus. This resolves the financial problem, but an update of the software has to be broadcasted to offer fair services to every user.

When an apparatus is out of action, for example in the power-off state or the like, equipment needs to transmit the update again; such a retransmission function may result in complexity of the equipment. Furthermore with an increase in the number of users, registration information of the users becomes enormous. This complicates management and control of the registration information in a server.

Pull technology allows users to designate data of the server to update data of the users' apparatus. In the system using pull technology, however, the designated data are just used to update the data of the apparatus without being assessed whether the designated data are most suitable for the user's apparatus. This leads to wrong operations and improper settings, which likely causes failures or pseudo-failures. Users need support from the apparatus distributor to solve these failures and cannot use the apparatus for a while, which impairs usability.

The present invention was made to solve the aforementioned problems and has an objective to provide an apparatus and a system capable of updating operating settings and functional settings of the apparatus through the network.

DISCLOSURE OF THE INVENTION

The present invention recited in scope of claim 1 comprises: installation data storage means for storing installation data including at least one piece of data chosen out of function processing data for performing functions of the apparatus, operation processing data for operating the apparatus, setting data for storing settings of the apparatus, state data for storing states of the apparatus and version data for storing version of each of the data; apparatus unique data storage means for storing data being unique to the apparatus; confirmation modification request generating means for generating a confirmation modification request including either a confirmation request to confirm a part or all of the installation data or a modification request for the modification or both; confirmation modification request transmitting means for transmitting the confirmation modification request generated by the confirmation modification request generating means and apparatus unique data stored by the apparatus unique data storage means with the addition of a part or all of the installation data stored by the installation data storage means; apparatus state analyzing means for analyzing the received apparatus unique data for the state of the apparatus; new installation data generating means for generating new installation data including either analysis result data generated based on the analysis in response to the confirmation request or modification data in response to the modification request or both; new installation data transmitting means for transmitting the generated new installation data; and installation data updating means for updating the installation data with the new installation data including either analysis result data generated in response to the confirmation request or modification data generated in response to the modification request or both.

In the invention of claim 1, the installation data storage means stores installation data including at least one piece of data chosen out of data on the function of the apparatus, operation of the apparatus, setting of the apparatus, state of the apparatus, version of each of the data while the apparatus unique data storage means stores the apparatus unique data.

The confirmation modification request generating means generates a confirmation modification request including either a confirmation request to confirm a part or all of the installation data or a modification request for the modification or both. The confirmation modification request transmitting means adds a part or all of the installation data stored by the installation data storage means to the confirmation modification request generated by the confirmation modification request generating means and the apparatus unique data stored by the apparatus unique data storage means, and transmits these request and data. In addition the apparatus state analyzing means analyzes the apparatus unique data for the state of the apparatus. The new installation data generating means generates new installation data including either analysis result data in response the confirmation request or modification data in response to the modification request or both, and the generated new installation data is transmitted by the new installation data transmitting means. Then the installation data updating means updates a part or all of the installation data with the new installation data.

The present invention is characterized in that at least one piece of data chosen out of data on the function of the apparatus, operation of the apparatus, setting of the apparatus, state of the apparatus, data version can be updated in the above-mentioned manner.

The present invention recited in scope of claim 2 comprises: installation data storage means for storing installation data including at least one piece of data chosen out of function processing data for performing functions of the apparatus, operation processing data for operating the apparatus, setting data for storing settings of the apparatus, state data for storing states of the apparatus and version data for storing version of each of the data; apparatus unique data storage means for storing data being unique to the apparatus; confirmation modification request generating means for generating a confirmation modification request including either a confirmation request to confirm a part or all of the installation data or a modification request for the modification or both; confirmation modification request transmitting means for transmitting the confirmation modification request generated by the confirmation modification request generating means and apparatus unique data stored by the apparatus unique data storage means with the addition of a part or all of the installation data stored by the installation data storage means; apparatus data communication means for transmitting and receiving a part or all of the installation data and the apparatus unique data among a plurality of apparatuses; apparatus state analyzing means for analyzing the apparatus unique data transmitted from the apparatus for the state of the apparatus; new installation data generating means for generating new installation data including either analysis result data generated based on the analysis in response to the confirmation request or modification data in response to the modification request or both; new installation data transmitting means for transmitting the generated new installation data; and installation data updating means for updating the installation data with the new installation data including either analysis result data generated in response to the confirmation request or modification data generated in response to the modification request or both.

In the invention of claim 2, the installation data storage means stores installation data including at least one piece of data chosen out of data on the function of the apparatus, operation of the apparatus, setting of the apparatus, state of the apparatus, version of each of the data while the apparatus unique data storage means stores the apparatus unique data.

The confirmation modification request generating means generates a confirmation modification request including either a confirmation request to confirm a part or all of the installation data or a modification request for the modification or both. The confirmation modification request transmitting means adds a part or all of the installation data stored by the installation data storage means to the confirmation modification request generated by the confirmation modification request generating means and the apparatus unique data stored by the apparatus unique data storage means, and transmits the request and data. If a first apparatus does not comprise the confirmation modification request generating means or the confirmation modification request transmitting means or both, confirmation modification request generating means provided to a second apparatus generates a confirmation modification request based on a part or all of the installation data and apparatus unique data of the first apparatus received through the apparatus data communication means. Then the confirmation modification request transmitting means adds a part or all of the received installation data stored by the installation data storage means of the first apparatus to the generated confirmation modification request and the received apparatus unique data stored by the apparatus unique data storage means of the first apparatus and transmits the request and data.

While the apparatus state analyzing means analyzes the apparatus unique data for the state of the apparatus, the new installation data generating means generates either analysis result data in response to the confirmation request or installation data in response to the modification request or both. Then the new installation data transmitting means transmits the generated new installation data.

The new installation data passes through the second apparatus and is installed to update a part or all of the installation data by the installation data updating means of either of the first apparatus or the second apparatus.

The present invention is characterized in that at least one piece of data chosen out of data on the function of the apparatus, operation of the apparatus, setting of the apparatus, state of the apparatus, data version can be updated in the above-mentioned manner.

The present invention recited in scope of claim 3 comprises: installation data storage means for storing installation data including at least one piece of data out of function processing data for performing functions of the apparatus, operation processing data for operating the apparatus, setting data for storing settings of the apparatus, state data for storing states of the apparatus and version data for storing version of each of the data; apparatus unique data storage means for storing data being unique to the apparatus; confirmation modification request generating means for generating a confirmation modification request including either a confirmation request to confirm a part or all of the installation data or a modification request for the modification or both; confirmation modification request transmitting means for transmitting the confirmation modification request generated by the confirmation modification request generating means and apparatus unique data stored by the apparatus unique data storage means with the addition of a part or all of the installation data stored by the installation data storage means; apparatus state analyzing means for analyzing the received apparatus unique data for the state of the apparatus; new installation data generating means for generating new installation data including either analysis result data generated based on the analysis in response to the confirmation request or installation data in response to the modification request or both; new installation data transmitting means for transmitting the generated new installation data; data control means for assigning one each of apparatus state analyzing means, new installation data generating means and new installation data transmitting means to generate and transmit a single piece of new installation data to an apparatus wherein the number of at lease one means out of the apparatus state analyzing means, new installation data generating means and new installation data transmitting means is two or more; and installation data updating means for updating the installation data with the new installation data including either analysis result data generated in response to the confirmation request or modification data generated in response to the modification request or both.

In the invention of claim 3, the installation data storage means stores installation data including at least one piece of data chosen out of data on the function of the apparatus, operation of the apparatus, setting of the apparatus, state of the apparatus, version of each of the data while the apparatus unique data storage means stores the apparatus unique data.

The confirmation modification request generating means generates a confirmation modification request including either a confirmation request to confirm a part or all of the installation data or a modification request for the modification or both. The confirmation modification request transmitting means adds a part or all of the installation data stored by the installation data storage means to the confirmation modification request generated by the confirmation modification request generating means and the apparatus unique data stored by the apparatus unique data storage means and transmits the request and data.

The data controlling means assigns one each of a plurality of apparatus state analyzing means, a plurality of new installation data generating means, a plurality of new installation data transmitting means to share their tasks. The assigned apparatus state analyzing means analyzes the apparatus unique data for the state of the apparatus. New installation data including either analysis result data in response to the confirmation request or modification data in response to the modification request or both, which is generated by the assigned new installation data generating means, is transmitted by the assigned new installation data transmitting means. Then the data control means controls to transmit a single piece of new installation data to an apparatus. The installation data updating means updates a part or all of the installation data with the new installation data.

The present invention is characterized in that at least one piece of data chosen out of data on the function of the apparatus, operation of the apparatus, setting of the apparatus, state of the apparatus, data version can be updated in the above-mentioned manner.

In addition to above-mentioned structure, the present invention recited in scope of claim 4 is characterized in that the confirmation modification request transmitting means and new installation data transmitting means comprise encryption means for making an encryption key by using a part or all of the apparatus unique data.

Specifically speaking, in the invention recited in a scope of claim 4, a part or all of the apparatus unique data is used as an encryption key by the encryption means, thereby preventing leakage of information on apparatus's operating setting and functional settings such as the confirmation modification request, apparatus unique data, installation data, analysis result data in response to the confirmation request, and new installation data in response to the modification request, also preventing the system from mischief such as hacking activity conducted through the network.

BEST MODE FOR CARRYING OUT THE INVENTION

Figure 1:
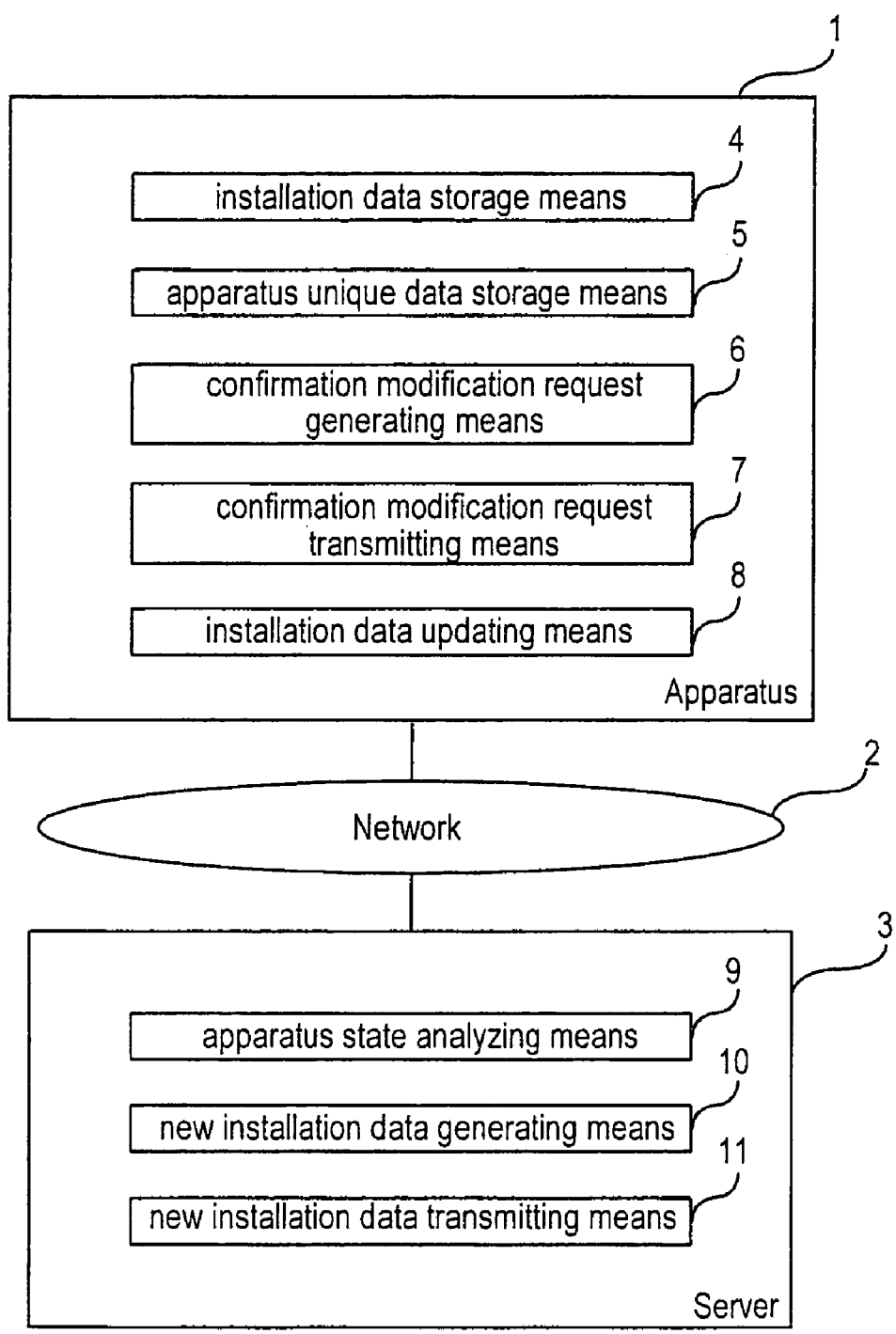
FIG. 1 is a block diagram schematically illustrating a configuration of a data updating system according to a first embodiment of the present invention.

The following are descriptions on embodiments of the present invention with reference to drawings. FIG. 1 is a block diagram schematically illustrating a configuration of a data updating system according to a first embodiment of the present invention. FIG. 1, to make it easier to understand, is represented by blocks each indicating a function of each device.

In the data updating system, an apparatus 1, which stores software including control programs and various data used therewith, is connected with a server 3, which stores files required to update data of the apparatus and has a function of controlling a file transmission, through a network 2.

The apparatus 1 incorporates a storage medium, not shown in FIG. 1, such as a flash memory and micro disk which stores data being unique to the apparatus along with the control programs and various data used therewith.

Figure 2:
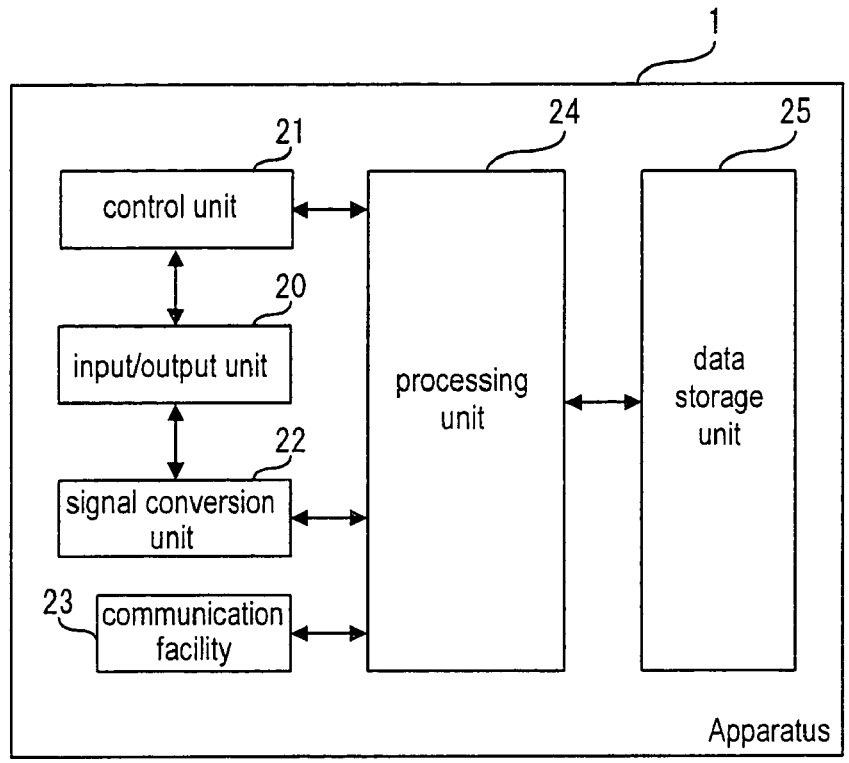
FIG. 2 is a block diagram illustrating a structure of hardware in an apparatus according to the first embodiment.

The apparatus I performs each function shown in FIG. 1 through a processing unit such as CPU, RISC and DSP, as shown in FIG. 2 and discussed below, reading off the stored control programs or data in sequence. Specifically the apparatus 1 can execute various functions to offer services as well as update a part or all of installation data with new installation data generated in response to a confirmation modification request.

In the apparatus 1, installation data storage means 4 stores installation data including at least one piece of data chosen out of data on the function of the apparatus, operation of the apparatus, setting of the apparatus, state of the apparatus, and data version, while apparatus unique data storage means 5 stores apparatus unique data.

Then confirmation modification request generating means 6 generates a confirmation modification request including either a confirmation request to confirm a part or all of the installation data or a modification request for the modification or both. The confirmation modification request generated by the confirmation modification request generating means 6 and the apparatus unique data stored in the apparatus unique data storage means 5 with the addition of a part or all of the installation data stored in the installation data storage means 4 are transmitted to the server 3 by confirmation modification request transmitting means 7. Subsequently installation data updating means 8 updates a part or all of the installation data (installation data necessary to be updated) with new installation data transmitted from the server 3.

In the server 3, files of various data required to update data of the apparatus 1 are stored in a control device or the like which is not shown.

The server 3 performs each function shown in FIG. 1 through an incorporated processing unit such as CPU, RISC and DSP, not shown in FIG. 1, reading off the stored control programs or the data in sequence. Specifically the server 3 executes various control functions shown in FIG. 1 as well as generates new installation data necessary for the apparatus 1 to receive services, and then transmits the new installation data to the apparatus 1.

In such a server 3, apparatus state analyzing means 9 analyzes the apparatus unique data for the state of the apparatus and new installation data generating means 10 generates new installation data including either analysis result data in response to the confirmation request or modification data in response to the modification request or both. Then new installation data transmitting means 11 transmits the generated new installation data.

In the data updating system according to the first embodiment configured in the above-mentioned way, the apparatus 1 generates a confirmation modification request and transmits the confirmation modification request and apparatus unique data with the addition of a part or all of the installation data to the server 3. The server 3 analyzes the apparatus unique data and the transmitted installation data on a basis of various data that are registered in the server 3 and are necessary to update data of the apparatus 1, generates optimal new installation data for the apparatus 1 in response to the confirmation modification request, and transmits the new installation data to the apparatus 1. The new installation data is supplied to update the installation data of the apparatus 1, thereby satisfying the confirmation modification request.

The apparatus 1 in this invention is an apparatus comprising a processing unit, data storage unit, and communication facility, and may be mobile terminals such as a cellular phone and a PDA, digital home appliances, devices for office automation and personal computers.

The network 2, connected with at least one apparatus 1 and server 3, may be the Internet, Local area network (LAN) at office or home, or cellular phone network.

The server 3 is one of control devices comprising a processing unit, data storage unit, communication facility, and file storage unit storing various data of apparatuses and may be various computers such as super computers, personal computers (PC) and work stations (WS).

FIG. 2 shows a structure of hardware in the apparatus 1 according to the first embodiment illustrated in FIG. 1.

The apparatus 1 comprises an input/output unit 20, a control unit 21 for controlling the input/output unit 20, a signal conversion unit 22 connected to the input/output unit 20 and for converting input/output signals from the input/output unit 20, a communication facility 23 for conducting communications, a processing unit 24 for controlling operation of the apparatus, and a data storage unit 25 for storing data. The processing unit 24 governs the operations of the apparatus 1 and controls the apparatus to receive certain services. The processing unit 24, which may be CPU, RISC, DSP or the like, controls the apparatus by reading off control programs or data one by one which stored in the data storage unit 25.

The input/output unit 20 comprises an input device such as a switch, microphone, sensor, keyboard including numeric keys and an output device such as a light emitting diode, laser diode, liquid crystal, CRT, speaker, motor: the input device is a means for converting information into an electric signal, which includes at least one input function out of switch input, voice input, photo sensor input, heat sensor input, pressure sensor input; and the output device is a means for converting an electric signal into information, which includes at least one output function out of text output, image output, voice output, light emission, heat generation.

The communication facility 23 is a means for transmitting and receiving information among apparatuses with or without wire. The wire system involves systems used for modem which uses public switched phone network; ISDN; ADSL; Ethernet which uses fiber-optic cable; Cable Television Network and so on. The wireless system involves systems used for a cellular phone, PHS, satellite phone, wireless LAN, Bluetooth, Infrared communication under IrDA standards, remote controller and so on. The communication facility 23 supports these systems to perform the transmission and reception.

The data storage unit 25 is a means of storing data, and more specifically, is a storage medium including a semiconductor memory such as a flash ROM, mask ROM, SRAM, DRAM, or a micro disk. Control programs or various data are stored in the data storage unit 25.

Apparatus unique data is one of the stored data and concerns hardware of the apparatus, including a name of the maker, model, type, serial number, processing ability such as CPU rate and memory capacity, data describing the hardware's configuration and data describing the hardware's state.

Installation data is one of the stored data and concerns software of the apparatus, including data of software to execute service functions and the version number of the software, type of the service function, the version number of the installation data, data of software to execute operational procedures of the apparatus and the version number of the software, data of software to detect failures and the version number of the software, certification data necessary to receive the services, secret numbers to identify user, and setting information such as IP address to establish a network.

Figure 3:
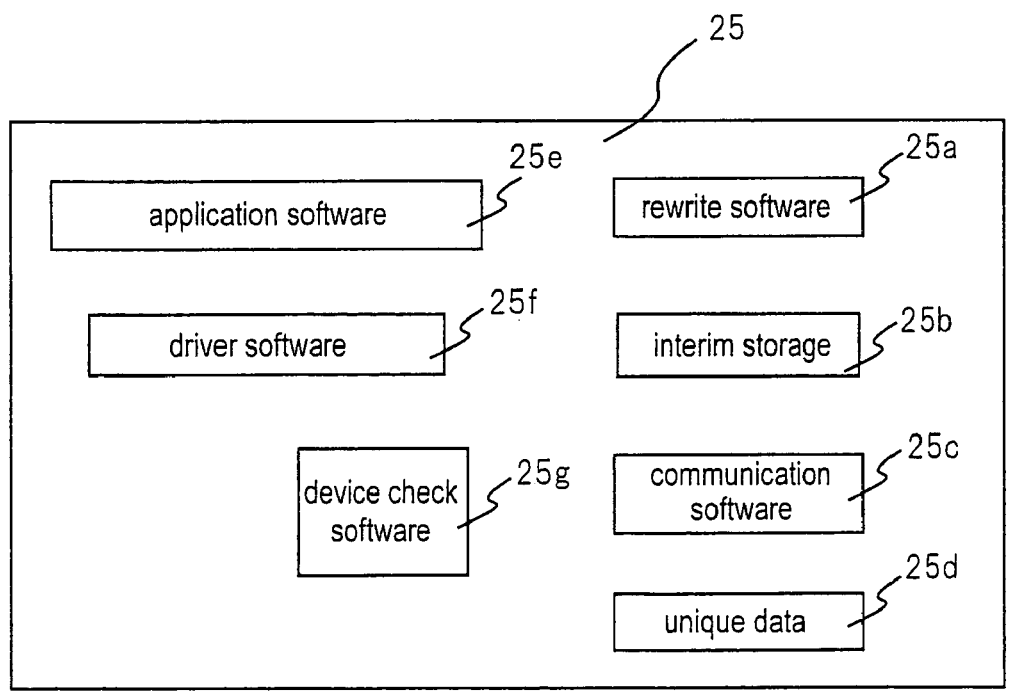
FIG. 3 is functional blocks schematically illustrating data stored in a data storage unit of the apparatus according to the first embodiment.

FIG. 3 is functional blocks schematically showing data stored in a data storage unit 25. In the data storage unit 25 there are areas to store programs to carry out above-mentioned various operations. An area for rewrite software 25a is for a program which runs to rewrite programs. When updating the apparatus, the program starts up to rewrite given program such as application software. The area, which is allocated for the rewrite program usually being unnecessary to be reprogrammed, is treated as a fixed area.

An area for communication software 25c is for a program to control the communication facility of the apparatus. Communication is controlled based on the program. An area for unique data 25d stores unique data of the apparatus, which is programmed at shipment, including a name of the maker, model, type, and serial number. The area, which is allocated for the unique data usually being unnecessary to be reprogrammed, is treated as a fixed area.

An area for application software 25e is for application programs, and stores various kinds of application software concerning various functions, operations, settings and so on. An area for driver software 25f stores driver software to control each elements of hardware. An area for device check software 25g stores a program to check the configuration of the hardware. An area for interim storage 25b, which is for temporarily storing programs such as a program to be used to rewrite programs, stores the transmitted program data once before the data are stored in each area. Above-mentioned application software, driver software, if necessary, and communication software are regarded as installation data of the apparatus to be updated.

Figure 4:
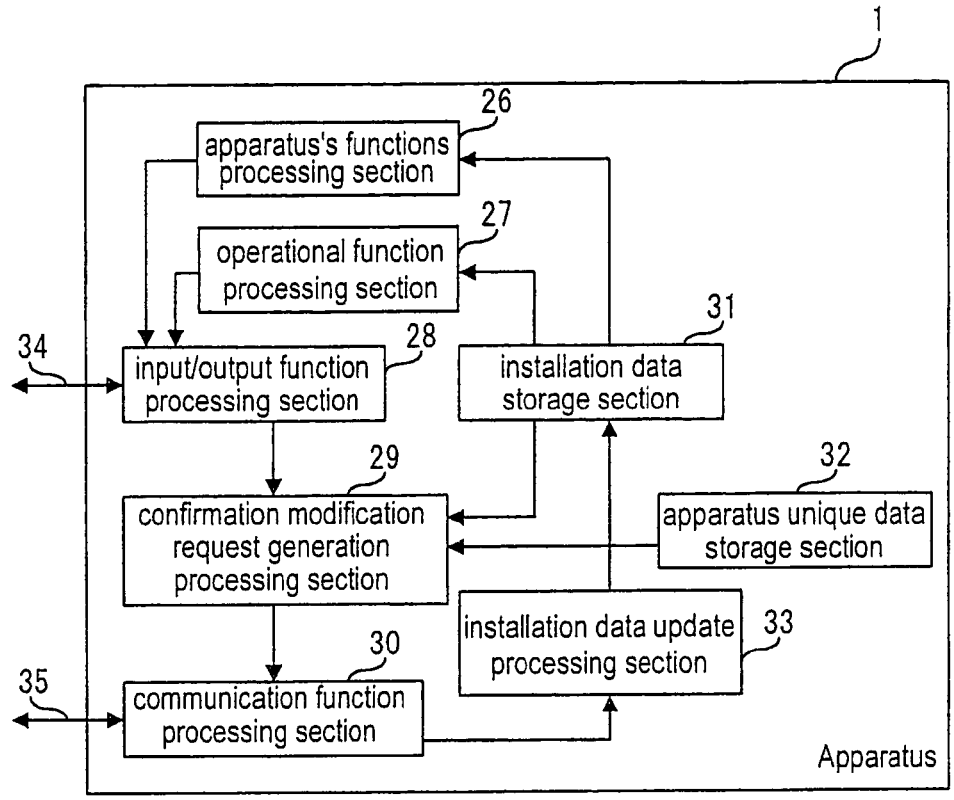
FIG. 4 shows a process structure of the apparatus according to the first embodiment.

The apparatus 1 implements each function shown in FIG. 1 with the above-mentioned processing unit 24 reading off control program or data from the data storage unit 25 in sequence. FIG. 4 shows a process structure representing functions in order to make it easy to understand operations by the processing unit 24 of the apparatus 1. Referring to FIG. 4, a description on the processing operations shall be provided.

When a confirmation modification request is required, a processing section for performing apparatus's input/output function 28 processes an input/output signal 34 from the input/output unit 20 in response to the requirement, and request for confirmation and modification is generated by a processing section for generating a confirmation modification request 29. A part or all of the installation data retrieved from an installation data storage section 31 in the data storage unit 25, and the apparatus unique data, retrieved from an apparatus unique data storage section 32 in the data storage unit 25, are added to the request for confirmation and modification to complete a confirmation modification request.

The confirmation modification request is transmitted as a communication signal 35 for the apparatus by way of a processing section for performing apparatus's communication function 30 of the communication facility unit 23.

When the communication signal 35 for the apparatus, which transmitted as new installation data, is received by the processing section for performing apparatus's communication function 30 of the communication facility 23, a processing section for updating apparatus's installation data 33 performs updating process in a way that the new installation data is stored in the installation data storage section 31 in the data storage unit 25. A processing section for performing apparatus's function 26 and a processing section for performing apparatus's operational function 27 performs various control operation to reflect the updated data on a function of the apparatus, operation of the apparatus, setting of the apparatus and state of the apparatus.

The process structure shown in FIG. 4 is not limited to processing operation performed by software or circuit design of hardware.

Figure 5:
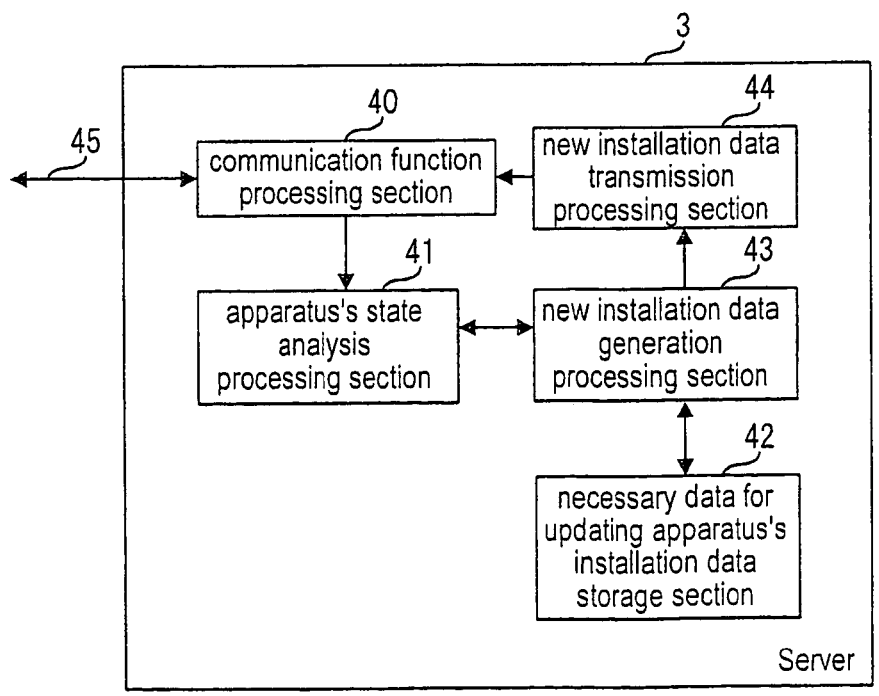
FIG. 5 shows a process structure of a server according to the first embodiment.

FIG. 5 shows main components of the server 3 represented by function according to the first embodiment shown in FIG. 1.

A processing section for performing communication function 40 of the server 3 receives a communication signal for server 45 transmitted through the network and a processing section for analyzing apparatus' state 41 analyzes the apparatus 1 by referring to the confirmation modification request. A processing section for generating new installation data 43 retrieves data, which is required to update the installation data of the apparatus 1, from a file storage section 42 based on the analysis obtained by the processing section for analyzing apparatus' state 41 in order to generate new installation data. The generated new installation data is formatted by a processing section for transmitting new installation data 44 into communication data applicable to the apparatus 1 and transmitted by the processing section for performing communication function 40. Furthermore, the server 3 can store data to establish the network, which include IP address of every apparatus 1 connected with the network 2, and can transmit essential data like IP address or the like to the apparatus 1. In short, the server 3 can store various data of a plurality of apparatus 1 connected with the network 2 and can transmit necessary installation data to one apparatus 1 by referring to information of the other apparatuses 1.

Figure 6:
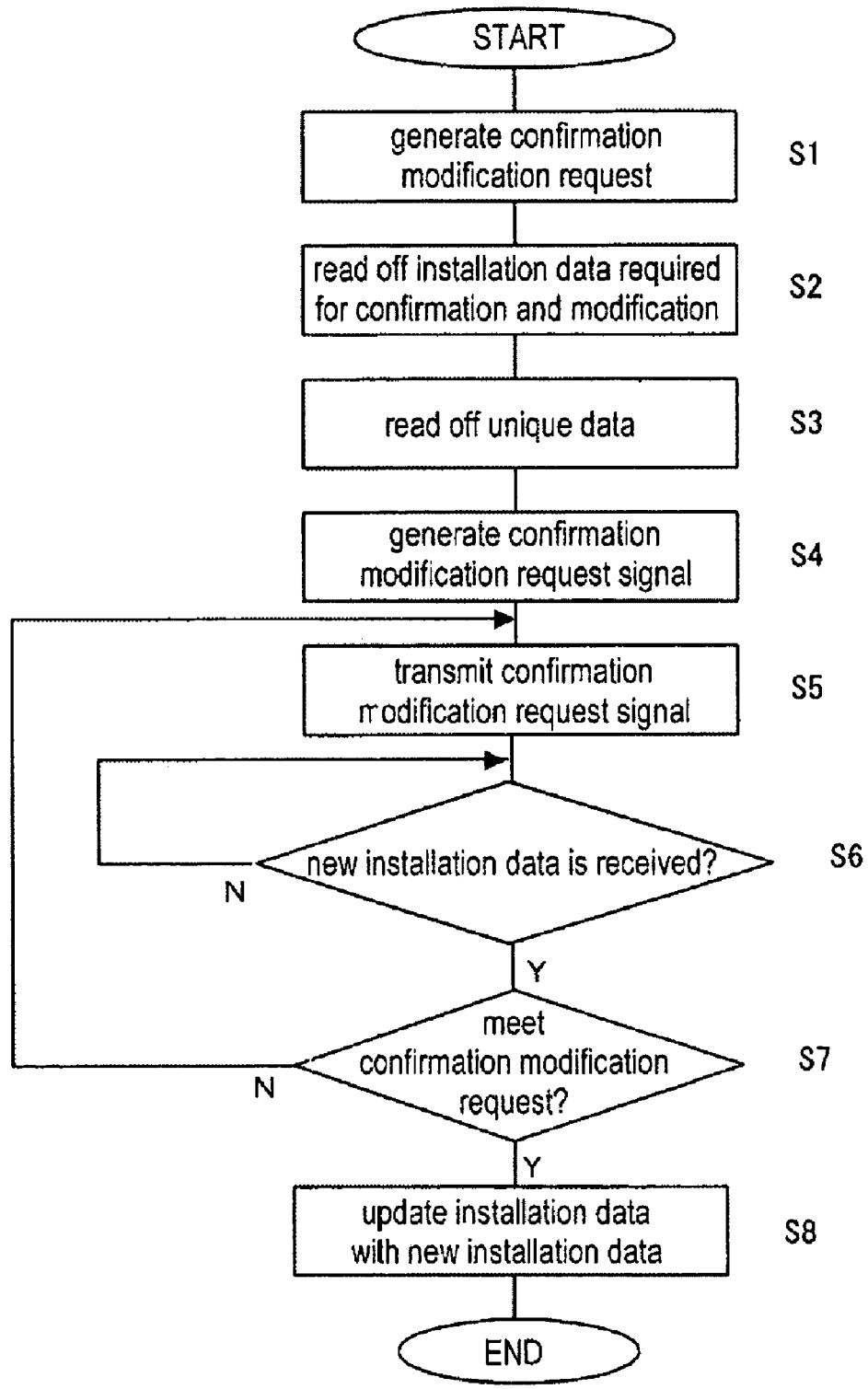
FIG. 6 is a flow chart indicating one example of the process performed by the apparatus according to the first embodiment.

FIG. 6 is a flowchart showing an example of processing steps taken by the apparatus 1. Referring to FIG. 6, the processing operation of the apparatus 1 is now described.

As is mentioned above, the apparatus 1 performs various controls with the processing unit 24 reading off various data and control programs stored in the data storage unit 25 in sequence. Installation data including function processing data, operation processing data, setting data, state data, version data are stored in the data storage unit 25 of the apparatus 1, which functions as the installation data storage means 4 shown in FIG. 1.

When a user makes a request for confirmation and modification with the use of the input/output unit 20, the apparatus 1 starts the processing steps shown in FIG. 6.

In step 1, the apparatus performs a process of generating the confirmation modification request. The request is generated by a user using the input/output unit 20 or by the control program automatically.

In step 2, the apparatus performs a process of reading off the installation data required for the confirmation and modification.

In step 3, the apparatus performs a process of reading off the apparatus unique data.

In step 4, the apparatus performs a process of generating a confirmation modification request signal by adding the data read off in step 2 and step 3.

In step 5, the apparatus performs a process of transmitting the confirmation modification request signal.

In step 6, the apparatus performs a process of confirming the receipt of the new installation data from the server 3.

In step 7, the apparatus determines whether the received new installation data meet the confirmation modification request. If not, the apparatus returns to step 5 to retransmit the confirmation modification request signal. If so, the apparatus proceeds to step 8 where a process of updating installation data with the new installation data is performed.

In this manner, a confirmation modification request including either the confirmation request to confirm a part or all of the installation data or the modification request for the modification or both is generated. The generated confirmation modification request is transmitted to the server 3 with the addition of apparatus unique data and a part or all of the installation data. Then the new installation data transmitted from the server 3 is used to update a part or all of the installation data.

A description will be made on examples in which a new installation data is stored into the data storage unit 25 of the apparatus 1.

A first example is now explained. When the apparatus receives an instruction for an update from the server 3, a program that runs upon rewriting programs is read off from a rewrite software area 25a. By following the operation of communication software stored in a communication software area 25c, stored in an interim storage area 25b is a new installation data. The new installation data stored in the interim storage area 25b is written into corresponding application software area 25e or a driver software area 25f by the operation of the rewrite program. This rewrite processing can rewrite intended program such as application software.

Usually the area, which is allocated for rewrite programs and communication programs being unnecessary to be reprogrammed, is treated as a fixed area, but occasionally such programs need to be updated. When an update of the rewrite programs and communication programs is needed, programs such as application software and driver software should be firstly rewritten. That's because, if the update of the rewrite program, which is performed ahead of the application software and driver software, ends in failure, succeeding operations cannot be taken. So after confirming that communication is completed, the communication software should be rewritten. The rewrite program should be rewritten at last. In this manner, even if the update of the rewrite program is failed, the other programs run normally, whereby the apparatus can work without trouble for a while. If the user finds errors in the rewrite program during the confirmation of the operation of the apparatus 1, the user can restore the apparatus 1 to proper working condition with maintenance.

Although data is once stored in the interim storage area 25b in the above-mentioned example, the data may be used to rewrite directly without being stored in the interim storage area 25b. In this case, a buffer memory should be provided in the communication facility 23 to use it as a buffer upon communication.

Figure 7:
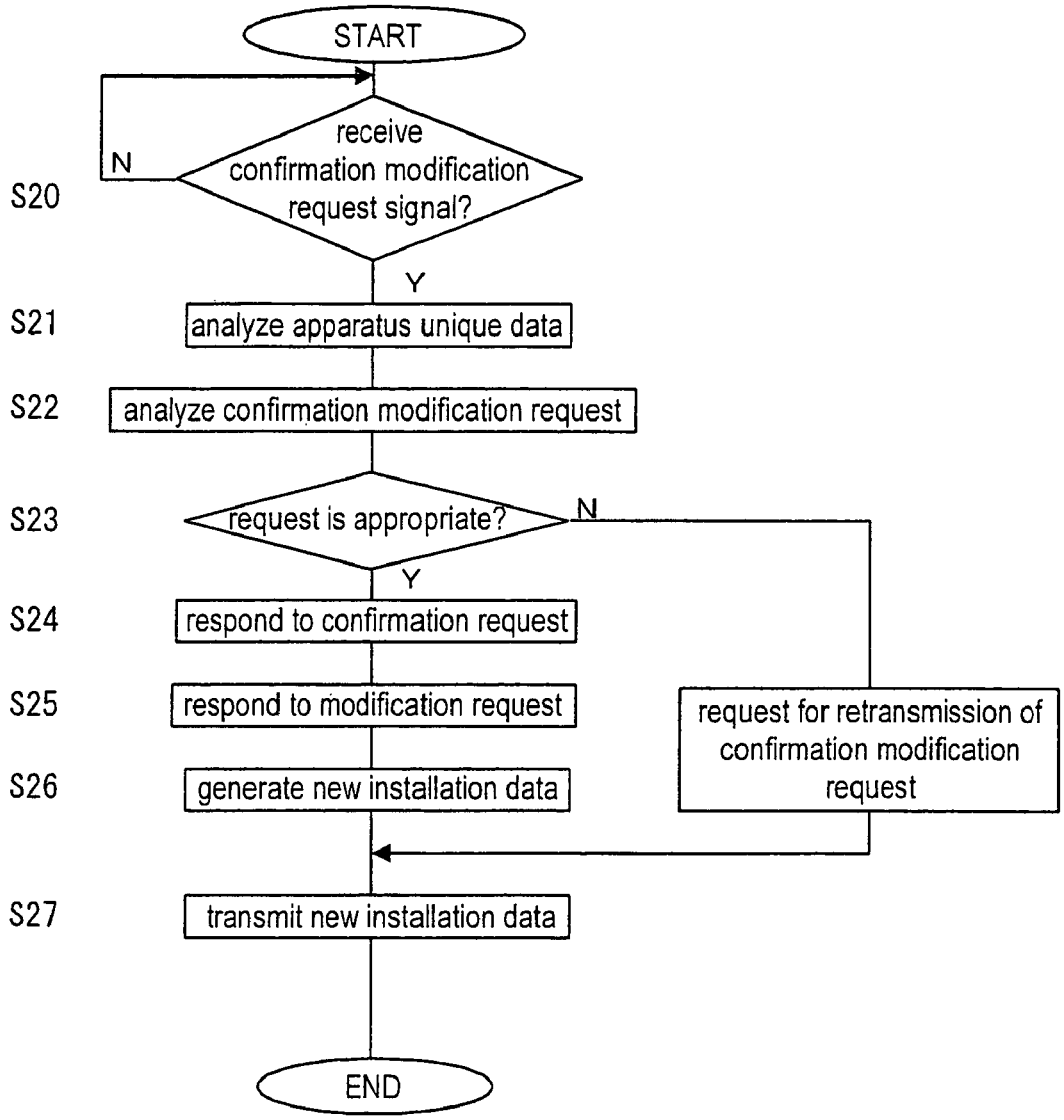
FIG. 7 is a flow chart showing one example of the process performed by the server according to the first embodiment.

FIG. 7 is a flowchart showing one example of processing steps taken by the server 3. Referring to FIG. 7, the processing operation of the server 3 is now described.

As shown in FIG. 20, the server 3 starts a process of the data updating system when the server 3 receives a confirmation modification request signal from the apparatus 1 through the network 2.

In step 21, the server 3 analyzes apparatus unique data transmitted from the apparatus 1 to find the name of the maker, mode, type, and performance of the apparatus 1 and searches for an area storing files.

In step 22, the confirmation modification request is analyzed to determine whether the confirmation modification request is in agreement with a result obtained by analyzing the apparatus unique data.

In step 23, the server performs a process of confirming whether the analyzed confirmation modification request is suitable for the apparatus 1. If the server determines that the confirmation modification request is suitable for the apparatus 1, the server proceeds to step 24 where a process of generating analysis result data in response to the confirmation request is performed with the searched file.

In step 25, the server performs a process of generating modification data in response to the modification request with the searched file.

In step 26, the server performs a process of generating new installation data with the analysis result data and the modification data.

Alternatively, if the server determines that the confirmation modification request is unsuitable for the apparatus 1 in step 23, the server proceeds to step 28 where a process of transmitting a retransmission request which requests to transmit the confirmation modification request again is performed.

In step 27, the server performs a process of transmitting the new installation data or the retransmission request with the addition of identification data of the apparatus 1.

In this manner, the server 3 analyzes the apparatus unique data for the state of the apparatus 1 as well as generates either the analysis result data in response to the confirmation request or the modification data in response to the modification request or both, and then transmits new installation data with the addition of the identification data of the apparatus 1.

In order to prevent leakage of information of apparatus such as an operating setting and a functional setting and to protect the system from mischief such as hacking activity conducted through the communication network, apparatus information such as a serial number and type number can be used as a key for encryption and decryption.

Second Embodiment

Although the apparatus 1 communicates with a single server 3 through the network 2 in the data updating system according to the first embodiment, the present invention is not limited to this. In a second embodiment, a data updating system comprises a plurality of second servers 60-1 . . . .

Figure 8:
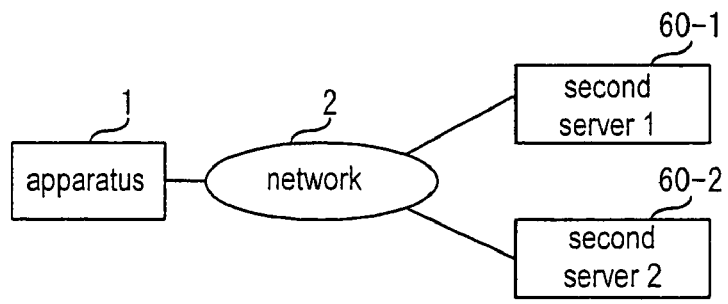
FIG. 8 is a block diagram schematically illustrating a configuration of a data updating system according to a second embodiment of the present invention.

A configuration of the data updating system according to the second embodiment is shown in FIG. 8. The apparatus 1 and the network 2 are same as those shown in FIG. 1 in the first embodiment, and are omitted their explanations here.

The second server 60-1 and 60-2 share files necessary for the apparatus 1. The second servers 60-1 or the server 60-2 has a higher priority than the other to carry out a process of updating data of the apparatus 1.

Figure 9:
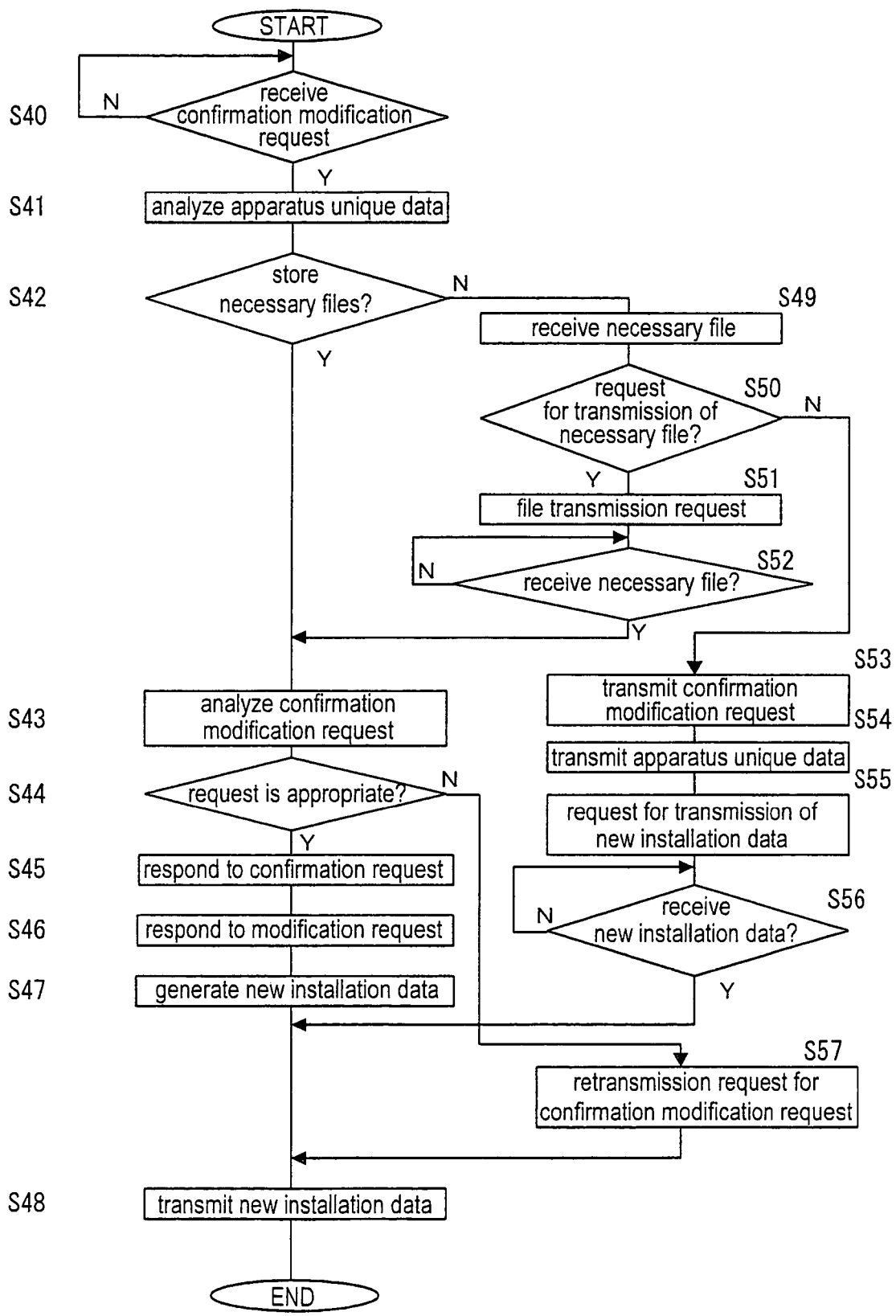
FIG. 9 is a flow chart showing one example of the process performed by the server according to the second embodiment.

FIG. 9 shows an example of a process by the second server 60-1.

As shown in step 40, when the second server [60-1], which takes high priority to perform a process of updating data, receives a confirmation modification request signal, a process according to this data updating system is initiated.

In step 41, after a name of the maker, mode, type, and performance of the apparatus 1 are found by analyzing the apparatus unique data, the second server [60-1] performs a process of searching an area storing files.

In step 42, the second server [60-1] searches for a server storing files necessary for the apparatus 1.

In the case where the second server [60-1] finds that the files are stored in the second server [60-1], the confirmation modification request is analyzed in step 43 and the second server [60-1] performs a process of determining whether the confirmation modification request meets the analysis result of the apparatus unique data.

In step 44, the second server [60-1] performs a process of confirming whether the confirmation modification request is appropriate to the apparatus 1.

If the second server [60-1] determines that the confirmation modification request is appropriate to the apparatus 1, the second server [60-1] performs a process of generating an analysis result data responding to the confirmation request with the searched file in step 45.

In step 46, the second server [60-1] performs a process of generating modification data responding to the modification request with the searched file.

In step 47, the second server [60-1] performs a process of generating new installation data with the analysis result data and modification data.

Alternatively, if the second server [60-1] determines that the confirmation modification request is inappropriate to the apparatus 1, the second server [60-1] proceeds to step 57 where a process of transmitting a retransmission request which requests again to transmit the confirmation modification request again is performed.

In step 48, the second server [60-1] performs a process of transmitting the new installation data or the retransmission request with the addition of the identification data of the apparatus 1.

If the second server [60-1] determines in step 42 that the necessary files are not stored in the second server [60-1], the second server [60-1] proceeds to step 49 where the second server [60-1] searches the second server [60-2] for the files necessary for apparatus 1.

When the second server [60-1] determines to generate installation data in step 50, the second server [60-1] requests the second server [60-2] to transmit the files necessary for the apparatus 1 in step 51.

Upon receiving the files necessary for the apparatus 1 in S52, the second server [60-1] stores the files and goes to step 43.

When the second server [60-1] determines not to generate installation data in step 50, the second server [60-1] proceeds to step 53. The second server [60-1] transmits a confirmation modification request to the second server [60-2] in step 53 and an apparatus unique data to the second server [60-2] in step 54. Also the second server [60-1] requests the second server [60-2] to generate new installation data and to transmit the generated data to the second server [60-1] in step 55.

Upon receiving the new installation data or the retransmission request from the second server [60-2] in step 56, the second server [60-1] goes to step 48.

Third Embodiment

Although the apparatus 1 is designed to directly communicate with the server 3 via the network 2 in the data updating system according to the first embodiment, the present invention is not limited to this. In a data updating system according to a third embodiment, a first apparatus 50 incapable of communicating with the server 3 is connected with the network 2 via a second apparatus 51 capable of communicating with the server 3.

Figure 10:
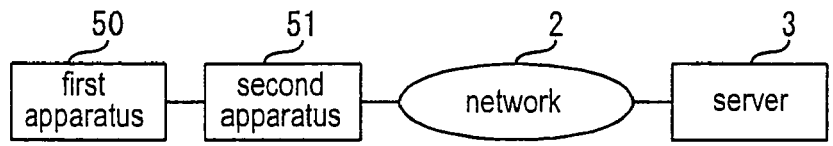
FIG. 10 is a block diagram schematically illustrating a configuration of a data updating system according to a third embodiment of the present invention.

FIG. 10 shows a configuration of the data updating system in the third embodiment. The sever 3 and the network 2 are same as those in the first embodiment shown in FIG. 1; descriptions are omitted here.

Figure 11:
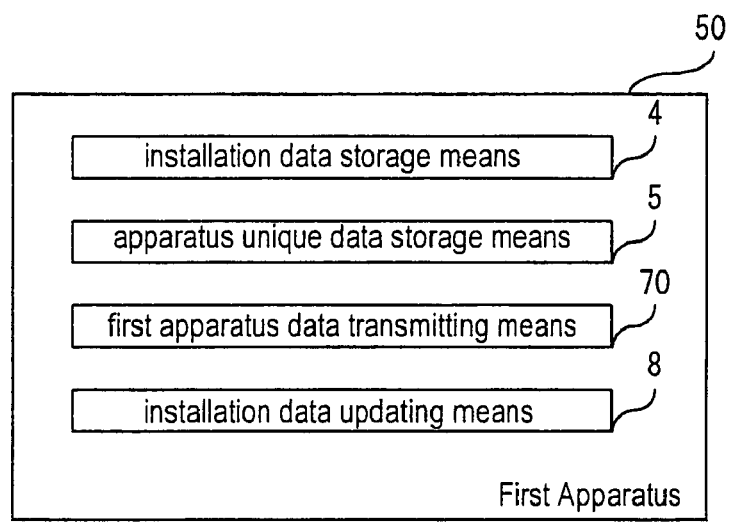
FIG. 11 shows a process structure of a first apparatus according to the third embodiment.

FIG. 11 shows a structure of the first apparatus 50. The first apparatus 50 comprises installation data storage means 4, apparatus unique data storage means 5, first apparatus data transmitting means 70 for transmitting data required by the second apparatus 51 to the second apparatus 51, and installation data updating means 8 for storing new installation data transmitted from the second apparatus 51 as installation data.

Figure 12:
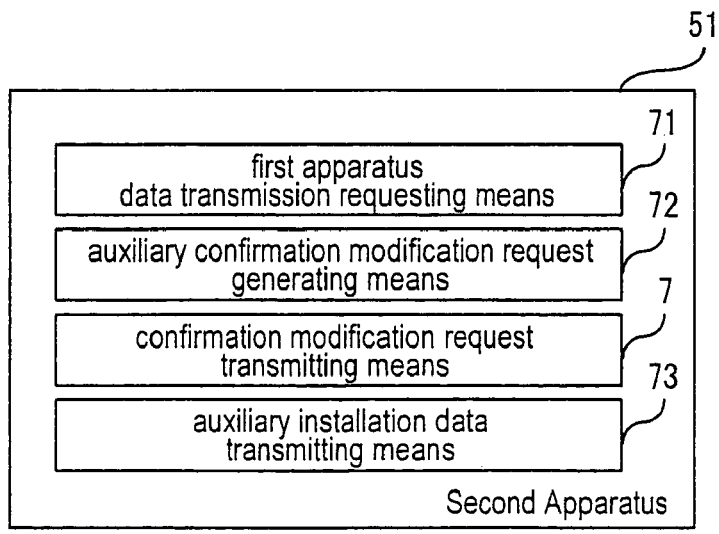
FIG. 12 shows a process structure of a second apparatus according to the third embodiment.

FIG. 12 shows a structure of the second apparatus 51. In a case where the first apparatus 50 does not comprise confirmation modification request generating means, the second apparatus 51 comprises auxiliary confirmation modification request generating means 72 for helping generate the confirmation modification request, apparatus data transmission requesting means 71 for requesting to transmit either installation data of the first apparatus 51 or apparatus unique data or both, auxiliary new installation data transmitting means 73 for transmitting new installation data to the first apparatus 51, and confirmation modification request transmitting means 7.

Figure 13:
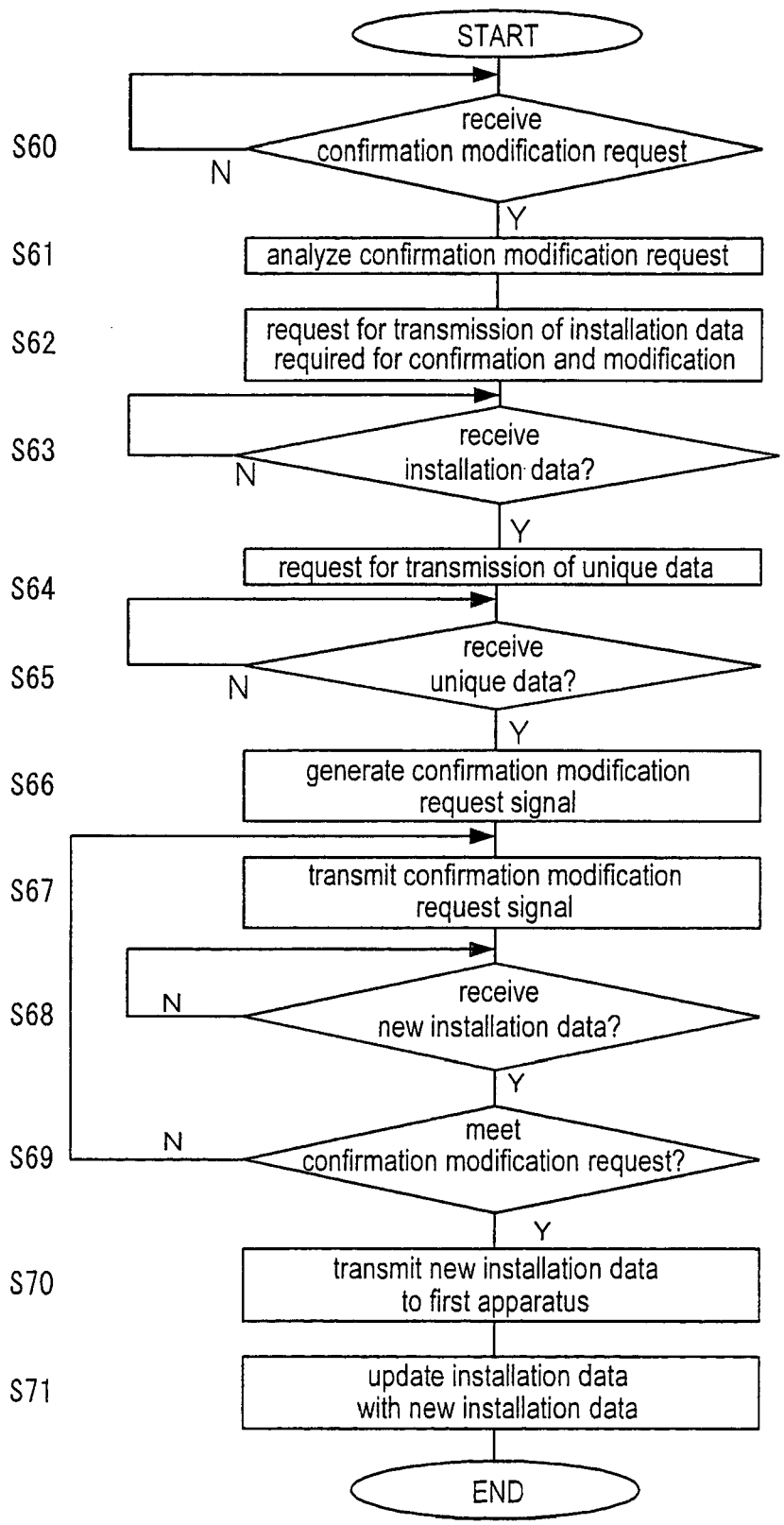
FIG. 13 is a flow chart showing one example of the process performed by the apparatuses according to the third embodiment.

FIG. 13 shows one example of a process performed by the first apparatus 50 and the second apparatus 51.

The process begins with the determination that a confirmation modification request is generated by the first apparatus 50 or the second apparatus 51 in step 60.

In step 61, the confirmation modification request is analyzed by the second apparatus 51. In step 62, the second apparatus 51 makes a request of the first apparatus 50 to transmit installation data required for the confirmation modification request.

After performing a process of reading off the required installation data that was specified in step 62, the first apparatus 50 transmits the installation data to the second apparatus 51.

Upon confirming the receipt of the installation data required for the first apparatus 50 in step 63, the second apparatus 51 requests the first apparatus 50 to transmit apparatus unique data of the first apparatus 50 in step 64.

The apparatus unique data that was read off by the first apparatus 50 is transmitted to the second apparatus 51.

Upon confirming the receipt of the apparatus unique data of the first apparatus 50 in step 65, the second apparatus 51, in step 66, generates a confirmation modification request signal by adding the required installation data received in step 63 and the apparatus unique data received in step 65 to the confirmation modification request.

In step 67, a process of transmitting the confirmation modification request signal is performed. In step 68, a process of confirming the receipt of new installation data from the server 3 is performed.

In step 69 it is determined whether the received new installation data meets the confirmation modification request. If not, the confirmation modification request signal is transmitted again. If so, the new installation data is transmitted to the first apparatus 50 in step 70.

In step 71, the first apparatus 50 performs a process of updating the installation data with the new installation data.

Accordingly, this system performs a process for updating the data of the first apparatus with an assist of the second apparatus.

Even if the server 3 is replaced with the plurality of servers 60, the same process can be performed.

Fourth Embodiment

Figure 14:
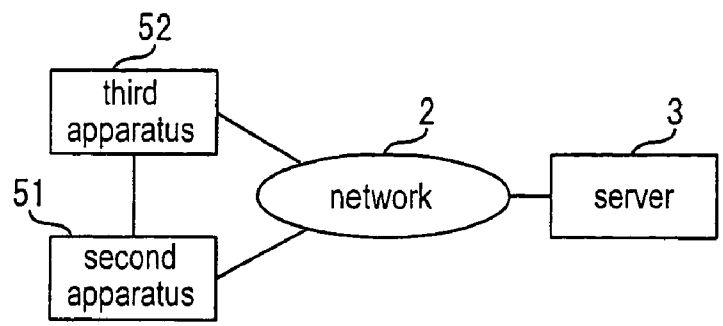
FIG. 14 is a block diagram schematically illustrating a configuration of a data updating system according to a fourth embodiment of the present invention.

Although the first apparatus is not connected with the network 2 in the data updating system according to the third embodiment, the present invention is not limited to this. In a data updating system according to a fourth embodiment, the first apparatus having a connection with the network is designed so as to communicate with the server through the second apparatus. FIG. 14 shows a configuration of the data updating system according to the fourth embodiment. The second apparatus 51, network 2 and sever 3 are same as those in the third embodiment shown in FIG. 10; descriptions are omitted here.

A third apparatus 52 can perform same process as that performed by the first apparatus 50 and also can communicate with the server.

The third apparatus 52, for example, is connected with the network 2 in the fourth embodiment, but may be configured so as to change or newly make the setting of the network 2 through the second apparatus 51. In the fourth embodiment, however, the third apparatus 52 is configured to make the setting of the network 2 in a same manner as the second apparatus 51. The third apparatus 52 transmits a modification request (including a new setting request) through the second apparatus 51 to the server 3. Upon receipt of the modification request, the server 3 generates new installation data suitable for the third apparatus 52 by referring to data installed in the second apparatus 51 and feeds the new installation data to the third apparatus 52 through the network 2 and the second apparatus 51. The installation data in the third apparatus 52 is then rewritten with the new installation data, thereby easily making the required network setting including IP address.

Even if the server 3 is replaced with the plurality of servers 60, the same process can be performed.

Fifth Embodiment

Although the single first apparatus 50 incapable of communicating with the server is connected with the network 2 through the second apparatus 51 capable of communicating with the server in the third embodiment, the present invention is not limited to this. In a data updating system according to a fifth embodiment, a plurality of first apparatuses 50 are connected with the network through the second apparatus 51 having communication facility.

Figure 15:
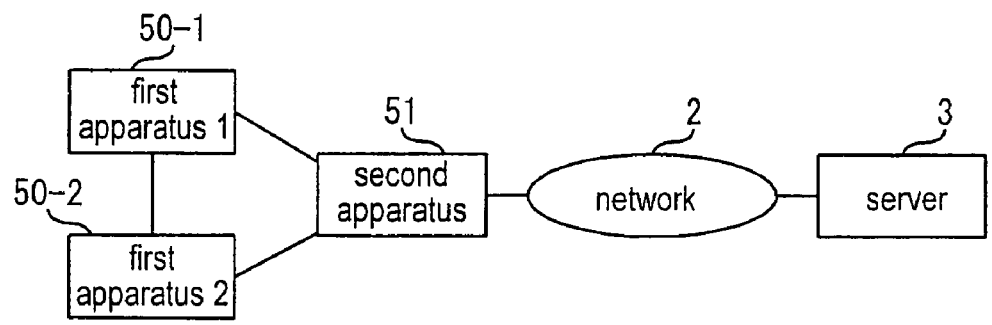
FIG. 15 is a block diagram schematically illustrating a configuration of a data updating system according to a fifth embodiment of the present invention.

FIG. 15 shows a configuration of a data updating system according to the fifth embodiment.

The first apparatuses [50-1], [50-2], second apparatus 51, network 2 and sever 3 are same as those in the third embodiment shown in FIG. 10; descriptions are omitted here.

Even if the server 3 is replaced with the plurality of servers 60, the same process can be performed.

Sixth Embodiment

Although the third apparatus 52 and the second apparatus 51 are connected with the single network in the fourth embodiment, the present invention is not limited to this. In a data updating system according to a sixth embodiment, the network connected with the third apparatus 52 is different from the network connected with the second apparatus 51.

Figure 16:
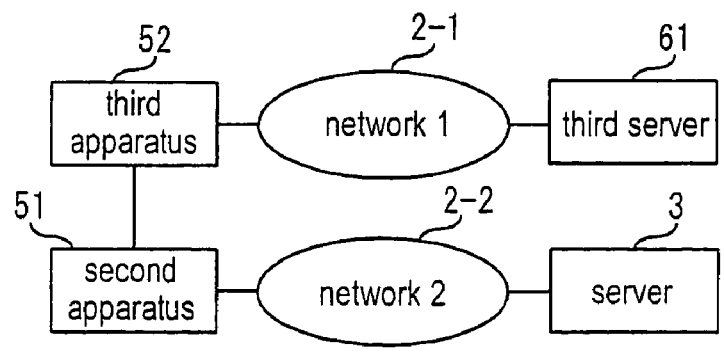
FIG. 16 is a block diagram schematically illustrating a configuration of a data updating system according to a sixth embodiment of the present invention.

FIG. 16 shows a configuration of a data updating system according to the sixth embodiment.

The third apparatus 52, second apparatus 51, network 2 and sever 3 are same as those in the third embodiment shown in FIG. 14; descriptions are omitted here.

In the case where a third server 61 does not store a file required to update data of the first apparatus, the data updating system performs a process of updating data of the first apparatus by using the second apparatus 51 which relays the required file transmitted from the server 3 through the network (2-2).

Even if the server 3 is replaced with the plurality of servers 60, the same process can be performed.

Seventh Embodiment

Although the plurality of servers are connected with a single network in the data updating system according to the second embodiment, the present invention is not limited to this. A data updating system according to a seventh embodiment comprises a plurality of servers and a plurality of networks.

Figure 17:
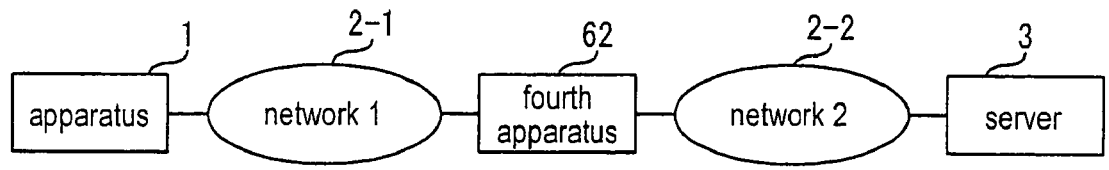
FIG. 17 is a block diagram schematically illustrating a configuration of a data updating system according to a seventh embodiment of the present invention.

FIG. 17 shows a configuration of a data updating system according to the seventh embodiment.

The apparatus 1, network (2-1), (2-2) and sever 3 are same as those in the second embodiment shown in FIG. 8; descriptions are omitted here.

A fourth server 62 having a top priority over the other connected servers performs a process of updating data of the first apparatus in a same manner as that by the server with a priority shown in FIG. 8.

Even if the server 3 is replaced with the plurality of servers 60, the same process can be performed. Also even if the apparatus 1 is replaced with the first apparatus 50, 52 and second apparatus 51, the process performed by the apparatus 1 in this embodiment can be executed by the first apparatus 50, 52 and second apparatus 51.

Eighth Embodiment

Although the apparatuses are connected with the network in the third, fourth, fifth and sixth embodiments, the present invention is not limited to this. In a data updating system according to an eighth embodiment, after the second apparatus 51 stores necessary files through the network, the second apparatus 51 is disconnected from the network to update data of the first apparatus 50.

Figure 18:
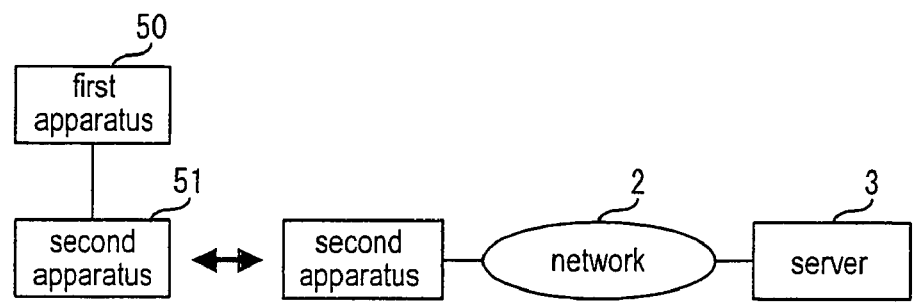
FIG. 18 is a block diagram schematically illustrating a configuration of a data updating system according to an eighth embodiment of the present invention.

FIG. 18 shows a configuration of a data updating system according to the eighth embodiment.

The first apparatus 50, second apparatus 51, network 2 and sever 3 are same as those in the third embodiment shown in FIG. 10; descriptions are omitted here.

Even if the server 3 is replaced with the plurality of servers 60, the same process can be performed. Also even if the first apparatus 50 is replaced with the third apparatus 52, the process performed by the apparatus 1 in this embodiment can be executed by the third apparatus 52.

Ninth Embodiment

Although the second apparatuses 51 that is disconnected from the network is connected to the first apparatus 50 in the data updating system according to the eighth embodiment, the present invention is not limited to this. In a data updating system according to a ninth embodiment, after a fourth apparatus 53 stores necessary files through the network (2-2), the fourth apparatus 53 is disconnected from the network (2-2) and connected to the network (2-1) that connects with the third apparatus 52 to update data of the third apparatus 52.

Figure 19:
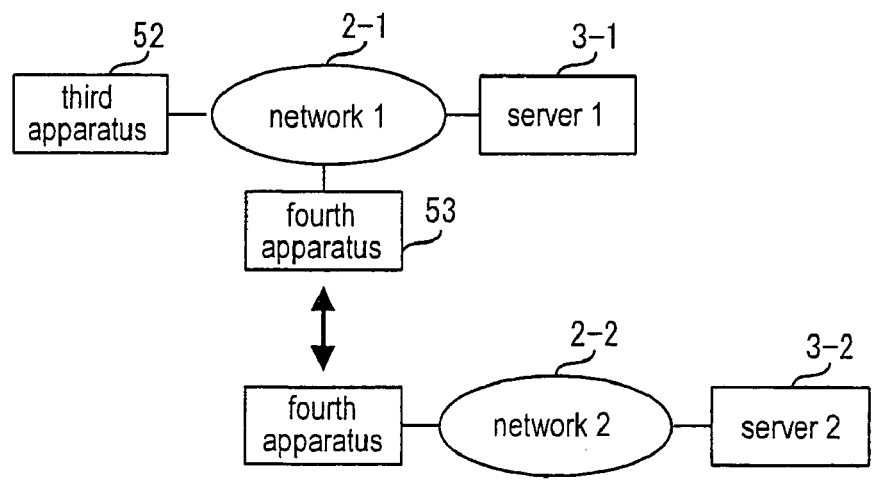
FIG. 19 is a block diagram schematically illustrating a configuration of a data updating system according to a ninth embodiment of the present invention.

FIG. 19 shows a configuration of a data updating system according to the ninth embodiment.

The third apparatus 52, network (2-1), (2-2) and sever 3 are same as those in the eighth embodiment shown in FIG. 18; descriptions are omitted here.

The third apparatus 53 can perform both processes shown in FIGS. 9 and 13.

Even if the server 3 is replaced with the plurality of servers 60, the same process can be performed.

According to the above-mentioned present invention, the apparatus that generates a confirmation modification request transmits the confirmation modification request accompanied with apparatus unique data and installation data to the server. The server analyzes the confirmation modification request, apparatus unique data and installation data in order to generate optimal new installation data in response to the confirmation modification request by using various data in files required for the data update. The apparatus then updates its own installation data with the new installation data.

The provision of the apparatus and system capable of updating operating settings and functional settings of the apparatus contributes optimal operating settings and functional settings of the apparatus in use. Therefore the apparatus can be optimized without increasing a program capacity used for processing functions and a program capacity used for dealing with high-functionality and multifunctionality, thereby reducing price and size of the apparatus.

Also the present invention realizes a user-friendly apparatus that supports the high-functionality and multifunctionality while maintaining simple operation.

The simple operation considerably prevents failures or pseudo-failures caused by improper setting, thereby maintaining usability.

Also the simple operation reduces the need for support of the user, which reduce the burdens of the support on an apparatus dealer.

Additionally the present invention can update the data of the apparatus to install new functions. Therefore the user does not need to buy an apparatus with the new functions, thereby suppressing profligate use of the resources associated with replacement purchases of the apparatus.

Furthermore apparatus information such as a serial number and type number can be used as a key for encryption and decryption, thereby preventing leakage of information of apparatus such as an operating setting and a functional setting and protecting the system from mischief such as hacking activity conducted through the communication network.

INDUSTRIAL APPLICABILITY

The following are examples of services that can be provided by the updating system for operating settings and functional settings according to the present invention.

[1] Key Operation Setting Update Service

For apparatuses such as cellular phones, mobile terminals, digital home appliances, personal computers, and office automation systems, this service updates operating settings below.

Change key operating procedure and create a client-original key operating procedure Change color of LED associated with key operations to identify the operating procedure by color

[2] Function Update Service

For apparatuses such as cellular phones, mobile terminals, digital home appliances, personal computers, and office automation systems, this service timely modifies functions below.

Select a function required by client from following functions;

Telephone, Navigation System, Medical service, Representative service, Home banking, Game, Intercom, Stereo Setting for the conventional type of apparatus so as to use newly started services

[3] Setting Auxiliary Service

For apparatuses such as cellular phones, mobile terminals, digital home appliances, personal computers, and office automation systems, this service supports to make the following settings in order to normally operate the apparatus's functions through the other communication device like cellular phone.

Communication setting of personal computers (modem etc.)

Network configuration at office and home

[4] Maintenance Service

For apparatuses such as digital home appliances, personal computers, office automation systems, and printers, this service makes a setting complying with manufacturing company and type of consumable items and a setting complying with parts replacement in the apparatus to offer safeguards against failures and to perform maintenance.

Change a setting for nonstandard product

Change maintenance condition for nonstandard product

Change of criterion of failure

Change a setting for new model consumable product made by the apparatus maker or the others Change a setting for new parts Change a setting to comply with the apparatus's condition that varies with time

[5] Function Upgrade Service

For apparatuses such as cellular phones, mobile terminals, digital home appliances, personal computers, and office automation systems, this service provides upgraded software in which existing functional problems are removed to improve the functions.

Provide upgraded software for removing functional bug of the apparatus

Provide upgraded software for increasing performance of the apparatus's function

[6] Setting Support Service

For apparatuses such as cellular phones, mobile terminals, digital home appliances, personal computers, and office automation systems, this service informs current setting condition and inappropriate setting (incomplete-input, incorrect-input) out of settings necessary for the function require by the user.

Notice of a setting item of the apparatus that is not set yet
Notice of a setting item of the apparatus that is incorrectly set Note that the above-indicated services are merely examples. The data updating system can update operating settings and functional settings that match conditions of various industries and applications.

I claim:

1. An apparatus setting updating system being characterized in updating data including at least one piece of data chosen out of data on the function of the apparatus, operation of the apparatus, setting of the apparatus, state of the apparatus, and data version, and comprising:

installation data storage means for storing installation data including at least one piece of data chosen out of function processing data for performing functions of the apparatus, operation processing data for operating the apparatus, setting data for storing settings of the apparatus, state data for storing states of the apparatus and version data for storing version of each of the data;

apparatus unique data storage means for storing data being unique to the apparatus said storing data comprising at least one selected from the group consisting of a name of the maker of the apparatus, a model type of time apparatus, and a serial number of the apparatus;

confirmation modification request generating means for generating a confirmation modification request including either a confirmation request to confirm a part or all of the installation data or a modification request for the modification, or both;

confirmation modification request transmitting means for transmitting the confirmation modification request generated by the confirmation modification request generating means and the apparatus unique data stored by the apparatus unique data storage means with the addition of a part or all of the installation data stored by the installation data storage means;

apparatus state analyzing means for analyzing the apparatus unique data, obtained from the apparatus, for the state of the apparatus;

new installation data generating means for generating new installation data including either analysis result data generated based on the analysis in response to the confirmation request or modification data in response to the modification request, or both;

new installation data transmitting means for transmitting the generated new installation data to the apparatus; and installation data updating means for updating the installation data in the installation data storage means with the received new installation data.

2. An apparatus setting updating system being characterized in updating data including at least one piece of data chosen out of data on the function of the apparatus, operation of the apparatus, setting of the apparatus, state of the apparatus, and data version, and comprising:

installation data storage means for storing installation data including at least one piece of data chosen out of function processing data for performing functions of the apparatus, operation processing data for operating the apparatus, setting data for storing settings of the apparatus, state data. for storing states of the apparatus and version data for storing version of each of the data;

apparatus unique data storage means for storing data being unique to the apparatus;

confirmation modification request generating means for generating a confirmation modification request including either a confirmation request to confirm a part or all of the installation data or a modification request for the modification, or both;

confirmation modification request transmitting means for transmitting the confirmation modification request generated by the confirmation modification request generating means and the apparatus unique data stored by the apparatus unique data storage means with the addition of a part or all of the installation data stored by the installation data storage means;

apparatus data communication means comprised in each of plurality of apparatuses for transmitting and receiving a part or all of the installation data and the apparatus unique data among the plurality of apparatuses;

apparatus state analyzing means for analyzing the apparatus unique data, obtained from the apparatus, for the state of the apparatus;

new installation data generating means for generating new installation data including either analysis result data generated based on the analysis in response to the confirmation request or modification data in response to the modification request, or both;

new installation data transmitting means for transmitting the generated new installation data; and installation data updating means for updating the installation data with the new installation data including either analysis result data generated in response to the confirmation request or modification data generated in response to the modification request, or both, wherein a first one of the plurality of apparatuses lacks at least one of confirmation modification request generating means and confirmation modification request transmitting means, a second one of the plurality of apparatuses has the at least one of confirmation modification request generating means and confirmation modification request transmitting means lacking from said first apparatus, and said first apparatus communicates with at least one of the apparatus state analyzing means and new installation data generating means via said second apparatus using said apparatus data communication means.

3. A client apparatus setting updating system being characterized in updating data including at least one piece of data chosen out of data on the function of the client apparatus, operation of the client apparatus, setting of the client apparatus, state of the client apparatus, and data version, and comprising:

a client apparatus having:

installation data storage means for storing installation data including at least one piece of data chosen out of function processing data for performing functions of the client apparatus, operation processing data for operating the client apparatus, setting data for storing settings of the client apparatus, state data for storing states of the client apparatus and version data for storing version of each of the data;

client apparatus unique data storage means for storing data being unique to the client apparatus including at least one of a name of the maker of the client apparatus, a model type of the client apparatus, and a serial number of the client apparatus;

confirmation modification request generating means for generating a confirmation modification request including either a confirmation request to confirm a part or all of the installation data or a modification request for the modification, or both;

confirmation modification request transmitting means for transmitting the confirmation modification request generated by the confirmation modification request generating means and the client apparatus unique data stored by the client apparatus unique data storage means with the addition of a part or all of the installation data stored by the installation data storage means; and installation data updating means for updating the installation data in the installation data storage means with received new installation data, and a server apparatus having:

client apparatus state analyzing means for analyzing client apparatus unique data, obtained from a client apparatus, for the state of the client apparatus;

new installation data generating means for generating new installation data including either analysis result data generated based on the analysis in response to the confirmation request or modification data in response to the modification request, or both;

new installation data transmitting means for transmitting the generated new installation data to the client apparatus.

4. A client apparatus setting updating system being characterized in updating data including at least one piece of data chosen out of data on the function of the client apparatus, operation of the client apparatus, setting of the client apparatus, state of the client apparatus, and data version, and comprising:

a first client apparatus having:

installation data storage means for storing installation data including at least one piece of data chosen out of function processing data for performing functions of the first client apparatus, operation processing data for operating the first client apparatus, setting data for storing settings of the first client apparatus, state data for storing states of the first client apparatus and version data for storing version of each of the data;

client apparatus unique data storage means for storing data being unique to the first client apparatus;

confirmation modification request generating means for generating a confirmation modification request including either a confirmation request to confirm a part or all of the installation data or a modification request for the modification, or both;

confirmation modification request transmitting means for transmitting the confirmation modification request generated by the confirmation modification request generating means and the client apparatus unique data stored by the client apparatus unique data storage means with the addition of a part or all of the installation data stored by the installation data storage means; and installation data updating means for updating the installation data in the installation data storage means with received new installation data, a second client apparatus having:

installation data storage means for storing installation data including at least one piece of data chosen out of function processing data for performing functions of the second client apparatus, operation processing data for operating the second client apparatus, setting data for storing settings of the second client apparatus, state data for storing states of the second client apparatus and version data for storing version of each of the data;

client apparatus unique data storage means for storing data being unique to the second client apparatus including at least one of a name of the maker of flue second apparatus, a model type of the second apparatus, and a serial number of the second apparatus; and installation data updating means for updating the installation data in the installation data storage means with received new installation data, and a server apparatus having:

client apparatus state analyzing means for analyzing client apparatus unique data, obtained from a client apparatus, for the state of said client apparatus;

new installation data generating means for generating new installation data including either analysis result data generated based on the analysis in response to the confirmation request or modification data in response to the modification request, or both;

new installation data transmitting means for transmitting the generated new installation data to said client apparatus.

wherein each of the first and second client apparatuses further comprise client apparatus data communication means for transmitting and receiving a part or all of the installation data and the client apparatus unique data among the client apparatuses; and said second client apparatus communicates with the server apparatus via the first client apparatus using said apparatus data communication means.

5. An apparatus setting updating system being characterized in updating data including at least one piece of data chosen out of data on the function of the apparatus, operation of the apparatus, setting of the apparatus, state of the apparatus, and data version, and comprising:

a client apparatus having:

installation data storage means for storing installation data including at least one piece of data chosen out of function processing data for performing functions of the client apparatus, operation processing data for operating the client apparatus, setting data for storing settings of the client apparatus, state data for storing states of the client apparatus and version data for storing version of each of the data;

apparatus unique data storage means for storing data being unique to the client apparatus;

confirmation modification request generating means for generating a confirmation modification request including either a confirmation request to confirm a part or all of the installation data or a modification request for the modification, or both;

confirmation modification request transmitting means for transmitting the confirmation modification request generated by the confirmation modification request generating means and the apparatus unique data stored by the apparatus unique data storage means with the addition of a part or all of the installation data stored by the installation data storage means; and installation data updating means for updating the installation data with the new installation data including either analysis result data generated in response to the confirmation request or modification data generated in response to the modification request, or both, and a server apparatus having:
    apparatus state analyzing means for analyzing the apparatus unique data, obtained from the client apparatus, for the state of the client apparatus;
    new installation data generating means for generating new installation data including either analysis result data generated based on the analysis in response to the confirmation request or modification data in response to the modification request, or both;
    new installation data transmitting means for transmitting the generated new installation data; and
    data control means for assigning one each of apparatus state analyzing means, new installation data generating means and new installation data transmitting means to generate and transmit a single piece of new installation data to an apparatus wherein the number of at least one means out of the apparatus state analyzing means, new installation data generating means and new installation data transmitting means is two or more.

6. An apparatus setting updating system according to any one of claims 1, 2, 3, 4 and 5 wherein the confirmation modification request transmitting means and new installation data transmitting means comprise encryption means for making an encryption key by using a part or all of the apparatus unique data.

* * * * *

UNITED STATES PATENT AND TRADEMARK OFFICE
CERTIFICATE OF CORRECTION

PATENT NO.        : 7,376,720 B2                                    Page 1 of 1
APPLICATION NO. : 10/472550
DATED             : May 20, 2008
INVENTOR(S)       : Tatsuya Fujii It is certified that error appears in the above-identified patent and that said Letters Patent is hereby corrected as shown below:

Title Page:

Item (22) should be read as follows:
--Mar. 20, 2002--

Item (30) should be read as follows:
--Mar. 23, 2001 (JP)................2001-086441--

Signed and Sealed this

Seventeenth Day of February, 2009

JOHN DOLL
*Acting Director of the United States Patent and Trademark Office*